(12) United States Patent
Fukui et al.

(10) Patent No.: US 6,230,973 B1
(45) Date of Patent: May 15, 2001

(54) METHOD OF INPUTTING PRINT-DESTINED DATA IN REWRITABLE CARD READ/WRITE APPARATUS

(75) Inventors: Takeshi Fukui; Hideaki Arakida; Yoshihiro Nabeshima, all of Matsusaka (JP)

(73) Assignee: Tokyo Magnetic Printing Co., Ltd., Tokyo (JP)

( * ) Notice: Subject to any disclaimer, the term of this patent is extended or adjusted under 35 U.S.C. 154(b) by 0 days.

(21) Appl. No.: 09/330,659

(22) Filed: Jun. 11, 1999

(30) Foreign Application Priority Data

Sep. 22, 1998 (JP) .................................................. 10-267965

(51) Int. Cl.[7] ...................................................... G06K 7/08
(52) U.S. Cl. .......................... 235/449; 235/487; 235/493
(58) Field of Search ..................................... 235/449, 441, 235/487, 493; 360/2

(56) References Cited

U.S. PATENT DOCUMENTS

| | | | | |
|---|---|---|---|---|
| 5,206,489 | * | 4/1993 | Warwick | 235/449 |
| 5,229,586 | * | 7/1993 | Ishii | 235/375 |
| 5,479,532 | * | 12/1995 | Abel et al. | 235/449 |
| 6,141,161 | * | 10/2000 | Sato et al. | 235/449 |

FOREIGN PATENT DOCUMENTS

405012519 * 1/1993 (JP) ...................................... 235/449

* cited by examiner

Primary Examiner—Michael G. Lee
Assistant Examiner—Daniel St Cyr
(74) Attorney, Agent, or Firm—Seidel, Gonda, Lavorgna & Monaco, PC

(57) ABSTRACT

A method of inputting print-destined data in rewritable card read/write apparatuses of a card utilization system very conveniently. A message edited by a computer (20) for rewritable card users is stored in a memory (23) provided in association with a magnetic head energizing means (21; 5) of a rewritable card read/write apparatus by way of an external-input interface (6). A magnetic card having at least one magnetic track for storing the message is inserted in the above-mentioned rewritable card read/write apparatus to thereby create a message card carrying the message from the magnetic card. The message card is inserted into another rewritable card read/write apparatus of the rewritable card utilization system for allowing a magnetic head provided in another rewritable card read/write apparatus to read the message for storing it in a memory of another apparatus so that the message can be printed on each of rewritable cards which will be inserted subsequently into another rewritable card read/write apparatus.

4 Claims, 3 Drawing Sheets

METHOD OF INPUTTING PRINT-DESTINED DATA IN REWRITABLE CARD READ/WRITE APPARATUS

BACKGROUND OF THE INVENTION

1. Field of the Invention

The present invention relates to a method of inputting previously print-destined data (i.e., data to be printed) in a rewritable card read/write apparatus.

2. Description of Related Art

In recent years, a rewritable card which carries rewritable print-destined data is employed in various commercial and other fields. Among others, the rewritable card is used widely as a so-called point card which is issued, for example, by the owner of a store or chain stores for the customers and which stores therein data of score or point which is incremented on a sale-by-sale basis so that the customer can enjoy a gift or coupon or discount equivalent to the accumulated monetary value indicated by the point recorded on the card. As an attempt for utilizing more effectively such point card, it is conceived to print on the point card the information concerning events or festivals scheduled to be held at a store or stores of a same group when the customer uses the point card, with the aim for promoting the merchandizing activity.

As a means for inputting such event information or the like, there can be conceived a method of utilizing a communication line or network on an on-line or off-line basis, a method of using general-purpose recording medium such as a floppy disk, a memory card or the like. However, the method relying on the line or network requires a large-scale system, involving high investment cost for realization. On the other hand, the method of using the general-purpose recording media such as the floppy disk or the like requires additional installation of a corresponding recording medium reading device in each of rewritable card read/write apparatuses employed in a card utilization system, incurring high cost for the realization.

SUMMARY OF THE INVENTION

In the light of the state of the art described above, it is an object of the present invention to provide a method which allows print-destined data to be inputted in a rewritable card read/write apparatus or apparatuses very conveniently and economically without resorting to the use of a communication network or a general-purpose recording medium.

In view of the above and other objects which will become apparent as the description proceeds, there is provided according to a general aspect of the present invention a method of inputting print-destined data in a rewritable card read/write apparatus, according to which a computer or the like data editing/inputting means is connected to an external-input interface for a magnetic head energizing means of a rewritable card read/write apparatus, a message for users of rewritable cards is edited with the aid of the computer, contents of the message is stored in a memory provided in association with the magnetic head energizing means by way of the external-input interface, a magnetic card which can be handled by the rewritable card read/write apparatus and which has at least one magnetic track for storing the message therein is inserted into the rewritable card read/write apparatus to thereby create a message card from the magnetic card, and the message card is inserted into other rewritable card read/write apparatus which belongs to a predetermined rewritable card utilization system for allowing a magnetic head provided in the other rewritable card read/write apparatus at a location corresponding to the magnetic track to read the contents of message for storing the message in a memory of the other rewritable card read/write apparatus so that the message can be printed on each of rewritable cards which will be inserted subsequently into the other rewritable card read/write apparatus.

In the method described above, the magnetic card which is of same shape and size as the rewritable card can be used as the medium for carrying and recording the data for printing. Thus, when the magnetic card serving as the message card is inserted into a rewritable card read/write apparatus installed, for example, at a storefront and belonging to a same system as the magnetic card creating rewritable card read/write apparatus through similar process as the rewritable card, the data printed or recorded on the magnetic card is read out by the magnetic head for the rewritable card to be stored in a storage space on a RAM (Random Access Memory) through the medium of a CPU (Central Processing Unit) incorporated in the rewritable card read/write apparatus. Thus, the print-destined data stored in the rewritable card read/write apparatus installed at the storefront can be outputted in the form of a printed message on each of rewritable cards which will be inserted subsequently by the customers until the data is updated.

In a preferred mode for carrying out the method mentioned above, the amount of the print-destined data to be magnetically stored can be increased by a factor of two by providing a pair of message storing magnetic tracks on at least one surface of the card at both sides thereof symmetrically to a center line extending in a direction in which the magnetic card is fed. In that case, in both of the message card creating step in which the magnetic card is inserted into the message card creating rewritable card read/write apparatus and the print-destined message storing step in which the message card is inserted into the other rewritable card read/write apparatus, the card may be so fed that one of the paired tracks is caused to pass by the magnetic head during a preceding half feeding stroke and that the other track is caused to pass by the magnetic head in a succeeding half feeding stroke after reversal of the feeding direction of the card at the end of the preceding half feeding stroke.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
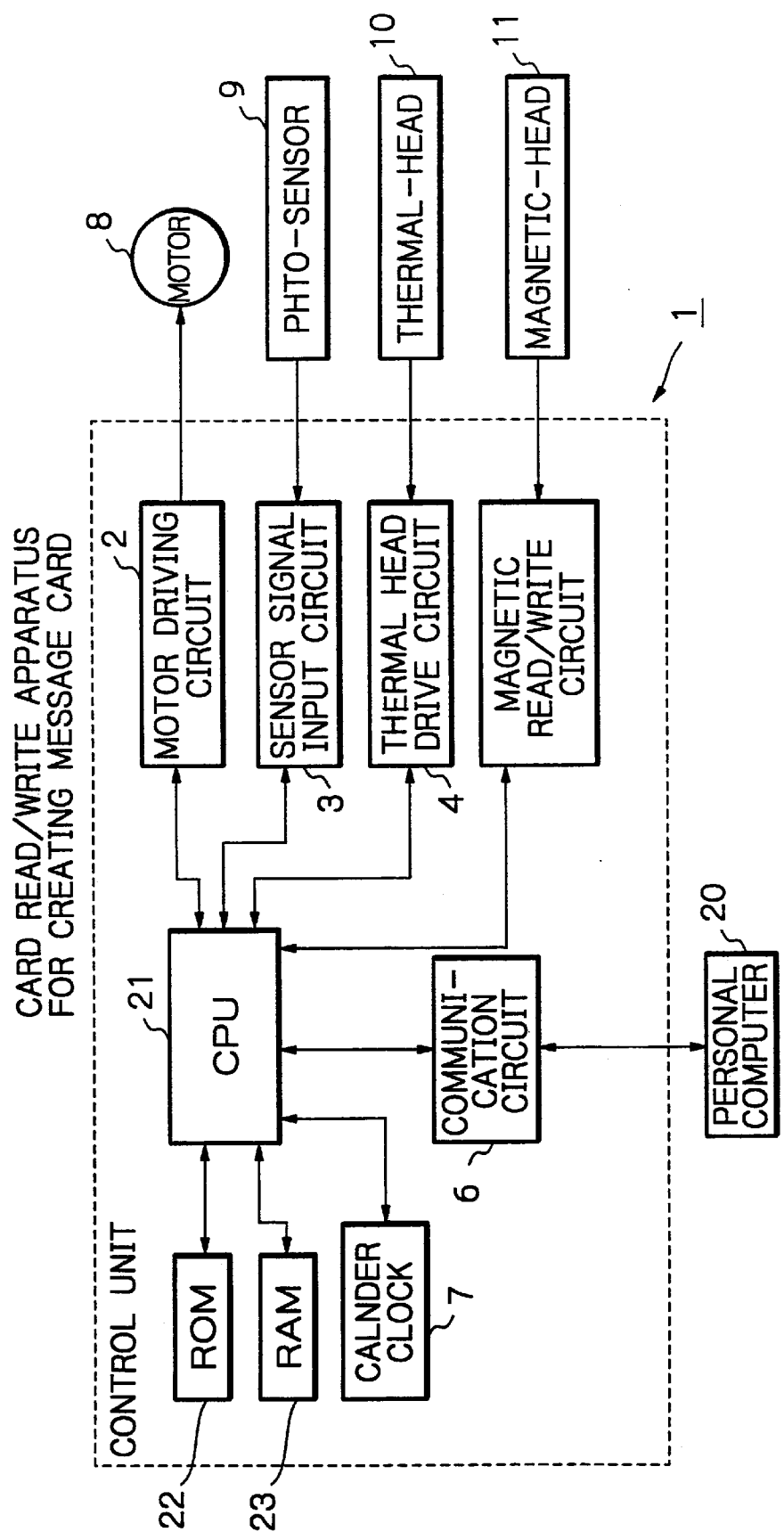
FIG. 1 is a block diagram showing an electric circuit configuration of a rewritable card read/write apparatus designed for creating a message card and adapted to be connected to a personal computer or the like message data edit/input means according to an embodiment of the present invention.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right", "top", "bottom", "upwardly", "downwardly" and the like are words of convenience and are not to be construed as limiting terms.

FIG. 1 is a block diagram showing an electric circuit of a rewritable card read/write apparatus shown in FIG. 1 according to an embodiment of the present invention. As mentioned previously, the rewritable card read/write apparatus is designed for creating a message card. In the figure, a circuit arrangement of a control unit 1 incorporated in the rewritable card read/write apparatus is shown as enclosed by a broken line. Individual components of the apparatus may be integrally incorporated in a substrate. Thus, the control unit 1 may also be referred to as the control substrate. Connected to the control unit 1 is a personal computer (PC) 20 for inputting print-destined data (i.e., data for printing). As can be seen in the figure, the control unit 1 is comprised of a CPU (central processing unit) 21 for controlling read/write operation as well as printing operation to be performed on a rewritable card (not shown), a ROM (read-only memory) 22 for storing programs to be executed by the CPU 21 and font data for the printing operation, and a RAM (random access memory) 23 serving for work register function for the program and at the same time for storing a variety of data. Further provided in association with the control unit 1 as peripheral or interface circuits are a motor driving circuit 2, a sensor signal input circuit 3 for receiving the output of a photo-sensor 9, a thermal head drive circuit 4 and a magnetic read/write circuit 5 which are known in the art. Additionally, the control unit 1 includes a communication circuit 6 provided for enabling communication between the personal computer 20 and the CPU 21, and a calendar clock 7.

In the control unit 1, the motor driving circuit 2 is designed for generating a pulse-like exciting current for driving controllably a drive motor 8 which is constituted by a stepping motor for transporting the rewritable card as inserted. The sensor signal input circuit 3 serves for supplying to the CPU 21 a detection signal outputted from a photo-sensor 9 employed for the purpose of positioning the rewritable card. The thermal head drive circuit 4 is designed for outputting data to be written to the thermal head 10 and an erasing pulse signal for erasing the printed data. Furthermore, the thermal head drive circuit 4 serves as the interface for fetching the output signal of a thermistor which is provided for measuring the temperature of the thermal head 10, wherein the thermistor signal as fetched is supplied to the CPU 21 via the thermal head drive circuit 4 for controlling the temperature of the thermal head 10. On the other hand, the magnetic read/write circuit 5 is designed for performing a modulation processing on output data signal to be supplied to a magnetic head 11 as well as demodulation of the data signal read out by the magnetic head 11 under the control of the CPU 21. The magnetic read/write circuit 5 can be used in both the magnetic data processing performed for the conventional rewritable card and the magnetic data processing for creating the message card according to the teaching of the present invention.

The motor driving circuit 2, the sensor signal input circuit 3, the thermal head drive circuit 4 and the magnetic read/write circuit 5 mentioned above are conventional functional modules known in this art. According to the teachings of the present invention, message data to be printed on a rewritable card (this data will hereinafter be referred to also as the print-destined message data) which has been created and/or edited with the aid of the personal computer 20 is supplied to the CPU 21 by way of the communication circuit 6 to be stored in an allocated memory area on the RAM 23. When a magnetic card formed in the same shape and size as the rewritable card mentioned above and having at least one magnetic track which can be treated by the magnetic head 11 of the rewritable card read/write apparatus now under consideration is inserted into the apparatus, a message card having a message written in or recorded on the magnetic track is created by the rewritable card read/write apparatus.

The calendar clock 7 incorporated in the control unit 1 is employed in the case where a plurality of messages edited by the personal computer and having a plurality of message start dates as the indexes are stored in the RAM (random access memory) 23 and written in the magnetic card by reading out the messages in accordance with dates while updating the same. In this conjunction, it is preferred to use the magnetic card of a large storage capacity having a plurality of magnetic tracks so that arrays of plural messages can be stored on a date-by-date basis.

Figure 2:
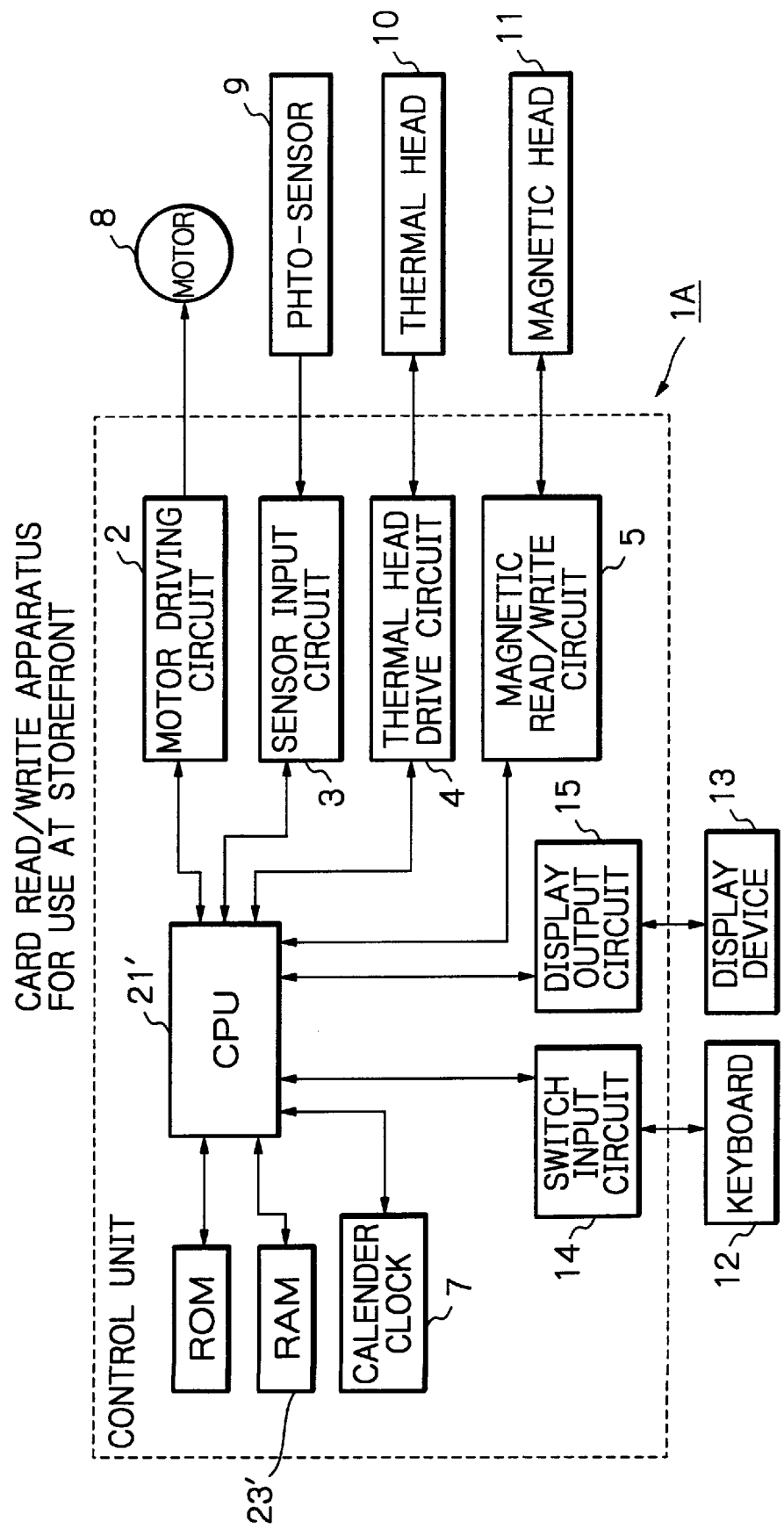
FIG. 2 is a block diagram showing a configuration of an electric circuit incorporated in another rewritable card read/write apparatus into which a message card as created by the apparatus shown in FIG. 1 is inserted.

FIG. 2 is a block diagram showing a configuration of an electric circuit incorporated in another rewritable card read/write apparatus which is destined to be installed, for example, at a storefront. In the figure, reference character 1A generally designates a control unit, wherein the components which serve for the functions same as or equivalent to those of the control unit 1 shown in FIG. 1 are designated by like reference numeral. It should however be noted that the rewritable card read/write apparatus shown in FIG. 2 is provided with a keyboard 12 for commanding change-over of monetary values of the point and other information. The keyboard 12 is connected to a CPU 21' incorporated in the control unit 1A by way of a switch input circuit 14, while a display device 13 is connected to the CPU 21' through a display output circuit 15. When the message card created by the apparatus shown in FIG. 1 as described previously is inserted into the rewritable card read/write apparatus installed at the storefront, the magnetic record data (message) recorded on the magnetic track(s) are read out to be stored in a RAM 23'. Since the date of the message is used as the index, as described hereinbefore, when a rewritable card is inserted by a customer, one message concerning an event or festival which is scheduled to run in the future is read out to be printed on the inserted rewritable card.

Figure 3:
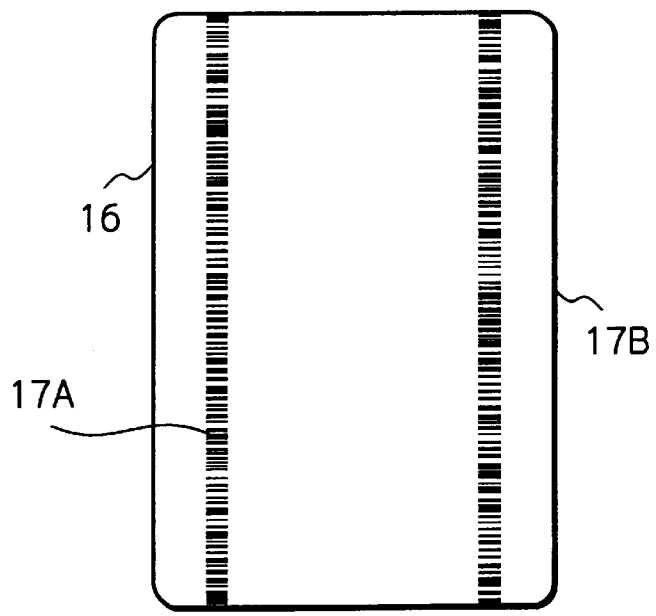
FIG. 3 is a top plan view showing a rewritable-type magnetic card to be used as a message card according to the teachings of the present invention.

FIG. 3 is a top plan view showing an example of a magnetic card to be used as the message card according to the present invention. Referring to the figure, a pair of magnetic tracks 17A and 17B are formed on a top surface of the magnetic card 16 symmetrically at left and right sides, as viewed in the figure. Accordingly, when this card is inserted in the message card creating read/write apparatus described hereinbefore by reference to FIG. 1 in a direction upwardly as viewed in the figure, the magnetic track 17A formed at the left side as viewed in FIG. 3A will move beneath the magnetic head of the read/write apparatus, while when the card is fed in the direction downwardly as viewed in the figure, the magnetic track 17B formed at the right side as viewed in FIG. 3 will pass by or beneath the magnetic head of the message creating card read/write apparatus shown in FIG. 1. Thus, the card provided with two tracks, as can be seen shown in FIG. 3 has a storage capacity twice as large as the card which has only one magnetic track. Parenthetically, the pair of magnetic tracks 17A and 17B may be formed on top and bottom surfaces, respectively, of the card symmetrically to the longitudinal center line of the card. In that case, the card may be inserted again into the read/write apparatus in an upside-down disposition.

Figure 4:
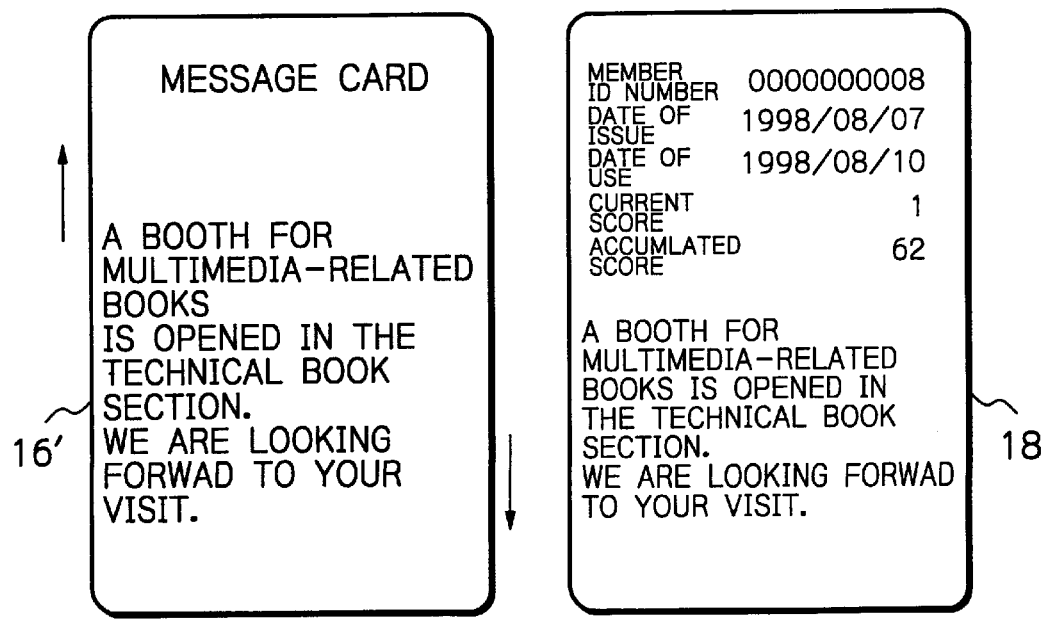
FIG. 4A is a top plan view of a message card on which message content is magnetically stored.
FIG. 4B is a top plan view showing a surface of a rewritable card on which the message transferred from the message card is printed.

According to the present invention, it is also taught to provide a rewritable print region on the magnetic card. In that case, a part of the message to be magnetically stored or recorded or the whole message may be printed in the rewritable print region so that the user can clearly grasp the recorded message at a glance. FIG. 4A is a plan view of a message card 16' on which message content is magnetically stored in the rewritable card reader installed at a storefront. Upon insertion of the card in the above-mentioned rewritable card reader, the message is printed, whereby the card is returned to the user or customer as a rewritable card 18 printed with the message, as illustrated in FIG. 4B which shows a surface of the rewritable card 18. Incidentally, FIG. 4B illustrates, only by way of example, a point card which is printed with a message informing the user or customer of start-up of a booth.

As is apparent from the foregoing, the message card 16' can be created from a rewritable-type magnetic card 16 by using a single rewritable card read/write apparatus connected to the personal computer. By delivering such message cards 16' to other rewritable card read/write apparatuses belonging to a same rewritable card utilization system, the message can easily be printed on the rewritable card in the other rewritable card read/write apparatus or apparatuses, respectively.

By virtue of such arrangement taught by the present invention that a personal computer is connected to one of rewritable card read/write apparatuses in a same type rewritable card utilization system for creating duplicatively message cards from a rewritable-type magnetic card and delivering the message cards to the other rewritable card read/write apparatuses of the card utilization system, it is possible to print very easily and economically at a given time a message of interest on the rewritable cards processed by each of the other rewritable card read/write apparatuses.

Many features and advantages of the present invention are apparent from the detailed description and thus it is intended by the appended claims to cover all such features and advantages of the apparatuses which fall within the true spirit and scope of the invention. Further, since numerous modifications and combinations will readily occur to those skilled in the art, it is not intended to limit the invention to the exact construction and operation illustrated and described.

By way of example, in place of the personal computer, other appropriate means for editing and inputting a message to the rewritable card read/write apparatus shown in FIG. 1 may be employed. Further, application of the present invention is never restricted to the point card. Other types of cards can be processed without departing from the scope of the invention. Of course, other information than the message such as illustrated herein can be dealt with.

Accordingly, all suitable modifications and equivalents may be resorted to, falling within the spirit and scope of the invention.

What is claimed is:

1. A method of inputting print-destined data in a read and/or write apparatus, comprising the steps of:

connecting a message editing and/or inputting means to an external-input interface of a magnetic head energizing means of the read and/or write apparatus;

editing a message for users of rewritable cards with said message editing and/or inputting means;

storing contents of said message in a memory provided in association with said magnetic head energizing means by way of said external-input interface;

inserting into a first read and/or write apparatus a magnetic card which is handled by said first apparatus and which has at least one magnetic track for storing said message into said magnetic card to thereby create a message card from said magnetic card; and inserting said message card into a second read and/or write apparatus which belongs to a predetermined rewritable card utilization system for allowing the magnetic head provided in said second read and/or write apparatus at a location corresponding to said magnetic track to read said contents of said message for storing said message in a memory of said second read and/or write apparatus so that said message is printed on each of rewritable cards which will be inserted subsequently into said second read and/or write apparatus.

2. The method of inputting print-destined data in the read and/or write apparatus as set forth in claim 1, wherein said magnetic card has magnetic tracks formed on at least one surface of said card and at both sides thereof symmetrically to a center line extending in a direction in which said magnetic card is fed, wherein said magnetic card is inserted into a first read and/or write apparatus for creating said message card and said message is stored in the memory of a second read and/or write apparatus when the card is inserted into said second read and/or write apparatus, said card is fed so that one of said pair of magnetic tracks passes by a magnetic head during a preceding half feeding stroke and the other track is caused to pass by said magnetic head in a succeeding half feeding stroke at the reversal of the feeding direction of said card at the end of said preceding half feeding stroke.

3. The method of inputting print-destined data in the read and/or write apparatus as set forth in claim 1, wherein said message edited by means of said message editing and/or inputting means is composed of an array of messages affixed with calendar dates, and wherein said first read and/or write apparatus is designed to create message cards which store therein messages afflxed with predetermined dates information.

4. The method of inputting print-destined data in the read and/or write apparatus as set forth in claim 1, wherein said magnetic card is a rewritable card, and wherein said first read and/or write apparatus is designed to print messages of concern on said rewritable card.

* * * * *

UNITED STATES PATENT AND TRADEMARK OFFICE
CERTIFICATE OF CORRECTION

PATENT NO.    : 6,230,973 B1
DATED         : May 15, 2001
INVENTOR(S)   : Takeshi Fukui et al.

It is certified that error appears in the above-identified patent and that said Letters Patent is hereby corrected as shown below:

<u>Title page,</u>
Add Assignee: F Engineering Co., Ltd.
              Mie-ken, Japan Signed and Sealed this Twelfth Day of February, 2002

Attest:

JAMES E. ROGAN
*Director of the United States Patent and Trademark Office*

*Attesting Officer*